(12) United States Patent
King et al.

(10) Patent No.: US 10,778,510 B2
(45) Date of Patent: Sep. 15, 2020

(54) COORDINATED NETWORK CONFIGURATION SYSTEM

(71) Applicant: Dell Products L.P., Round Rock, TX (US)

(72) Inventors: Colin Joseph King, Round Rock, TX (US); Brahmananda Reddy Thodati, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 630 days.

(21) Appl. No.: 15/401,931

(22) Filed: Jan. 9, 2017

(65) Prior Publication Data
US 2018/0198888 A1    Jul. 12, 2018

(51) Int. Cl.
*H04L 29/08*    (2006.01)
*H04L 12/24*    (2006.01)

(52) U.S. Cl.
CPC ...... *H04L 41/0806* (2013.01); *H04L 41/0846* (2013.01)

(58) Field of Classification Search
CPC .............................. H04L 65/601; H04L 47/76
See application file for complete search history.

(56) References Cited

U.S. PATENT DOCUMENTS

| | | | | |
|---|---|---|---|---|
| 2008/0186875 A1* | 8/2008 | Kitani | ................. | H04L 41/0816 370/254 |
| 2009/0150878 A1* | 6/2009 | Pathak | ..................... | G06F 8/65 717/172 |
| 2013/0145005 A1* | 6/2013 | Sunderrajan | .......... | H04L 67/141 709/223 |

(Continued)

OTHER PUBLICATIONS

X. Liu, I. Bryskin, V. Beeram, T. Saad, H. Shah and O. Gonzalez de Dios, "draft-liu-netmod-yang-schedule-01—A Yang Data Model for Configuration Scheduling, A Yang Data Model for Configuration Scheduling—Draft-Liu-Netmod-Yang-Schedule-01," Sep. 17, 2016, 8 Pages, https://tools.ietf.org/html/draft-liu-netmod-yang-schedule-01.

*Primary Examiner* — Shean Tokuta
*Assistant Examiner* — Juan C Turriate Gastulo
(74) *Attorney, Agent, or Firm* — Haynes and Boone, LLP

(57) ABSTRACT

A coordinated network configuration system includes a management network, a management device that is coupled to the management network and that is configured to provision networking device configurations through the management network, and a plurality of networking devices. A first networking device is coupled to the management device through the management network and receives a first networking device configuration from the management device through the management network. The first networking device then stores the first networking device configuration. The first networking device then determines that each of the plurality of networking devices have received respective networking device configurations and, in response, performs coordinated configuration operations using the first networking device configuration while each of the others of the plurality of networking devices performs the coordinated configuration operations using their respective networking device configurations. As such, a network including the plurality of networking devices is configured in a coordinated manner.

20 Claims, 8 Drawing Sheets

(56) References Cited

U.S. PATENT DOCUMENTS

2015/0271016 A1* 9/2015 Seligson ............. H04L 41/0813
    709/220
2016/0316420 A1* 10/2016 Mustafa ................ H04W 48/16
2017/0257309 A1* 9/2017 Appanna ............... H04L 45/245

* cited by examiner

COORDINATED NETWORK CONFIGURATION SYSTEM

BACKGROUND

The present disclosure relates generally to information handling systems, and more particularly to the coordinated configuration of networked information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as for example, networking devices, are sometimes deployed over geographically distant locations and rely on remote access to configure those networking device. For example, large numbers of switches are often deployed in different geographic locations to provide one or more networks for a business, and are typically configured using network management systems that remotely connect to and configure those switches via a management network. Such mass deployments of switches may include a variety of different networking topologies, with the switches providing a variety of different networking features, and typically require dedicated and knowledgeable on-site personnel at each geographic location in which the switches are deployed in order to remedy a variety of issues that arise during the complicated and tedious steps that are required to remotely configure a large number of switches in a network deployment using conventional methods.

For example, switches in a network are often provided configurations that are dependent on the configurations other switches in the network, and those configurations may require that both switches maintain connectivity throughout the full configuration of each of the switches. However, conventional network management systems operate to configure switches in a network deployment one-at-a-time by, for example, pushing a first configuration to a first switch (e.g., via Command Line Interface (CLI) commands, Secure Socket Shell (SSH) commands, etc.) for execution one configuration command at a time in order to configure the first switch, pushing a second configuration to a second switch for execution one configuration command at a time in order to configure the second switch, and so on until all of the switches in the network deployment have been configured. Such conventional network configuration can raise issues, particularly when configuration command sets operate to cause interface ports on one or more of the switches to shut down and/or otherwise lose communication capabilities with the network management system.

In a specific example, the network management system may be directly connected to a first switch via the management network, and indirectly coupled to a second switch via one of a plurality of links (a "management link") between the first switch and the second switch. In many situations, the configuration of the first switch and the second switch may include placing the plurality of links between the first switch and the second switch into a Link Aggregation Group (LAG). However, using the conventional network configuration techniques discussed above, the network management system provides the first switch a first configuration that operates to configure the first switch ports on the first switch (which provide the corresponding plurality of links to the second switch) for the LAG. However, configuration commands for such a first configuration will cause those first switch ports on the first switch to "go down" (i.e., disable communication via those first switch ports due to the mismatch in port configurations with the second switch ports on the second switch) in order to form the LAG, and those first switch ports will then wait for the configuration of the second switch ports on the second switch (which provide the corresponding plurality of links to the first switch) for the LAG (i.e., that matches the LAG configuration of the first switch ports.) When the network management system then attempts to provide the second switch a second configuration (i.e., that would configure the second switch ports on the second switch to provide their corresponding links in the LAG), it will be unable to do so because the first switch port on the first switch that provides the management link (e.g., a link between trunk ports that provides for the management and communication of other data between the first and second switch) to the second switch is "down" and waiting for the configuration of the second switch port (i.e., with the matching port configuration for the LAG.) In such situations, on-site personnel must then go to the physical location of the second switch to apply the second configuration that provides the plurality of links between the first switch and the second switch in the LAG. These and other complications that arise from conventional, remote network configuration systems increase the time needed and costs associated with configuring networks, as well as prevent truly remote network configuration operations.

Accordingly, it would be desirable to provide an improved network configuration system.

SUMMARY

According to one embodiment, an Information Handling System (IHS) includes a communication subsystem; a processing system that is coupled to the communication subsystem; and a memory system that is coupled to the processing system and that includes instruction that, when executed by the processing system, cause the processing system to provide a configuration engine that is configured to: receive, through the communication subsystem from a management device via a management network, a first networking device configuration; store the first networking device configuration; and determine that each of a plurality of networking devices that are coupled to the management device have received respective networking device configurations and, in response, perform coordinated configuration operations using the first networking device configuration while each of the others of the plurality of networking devices performs the coordinated configuration operations using their respective networking device configurations.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
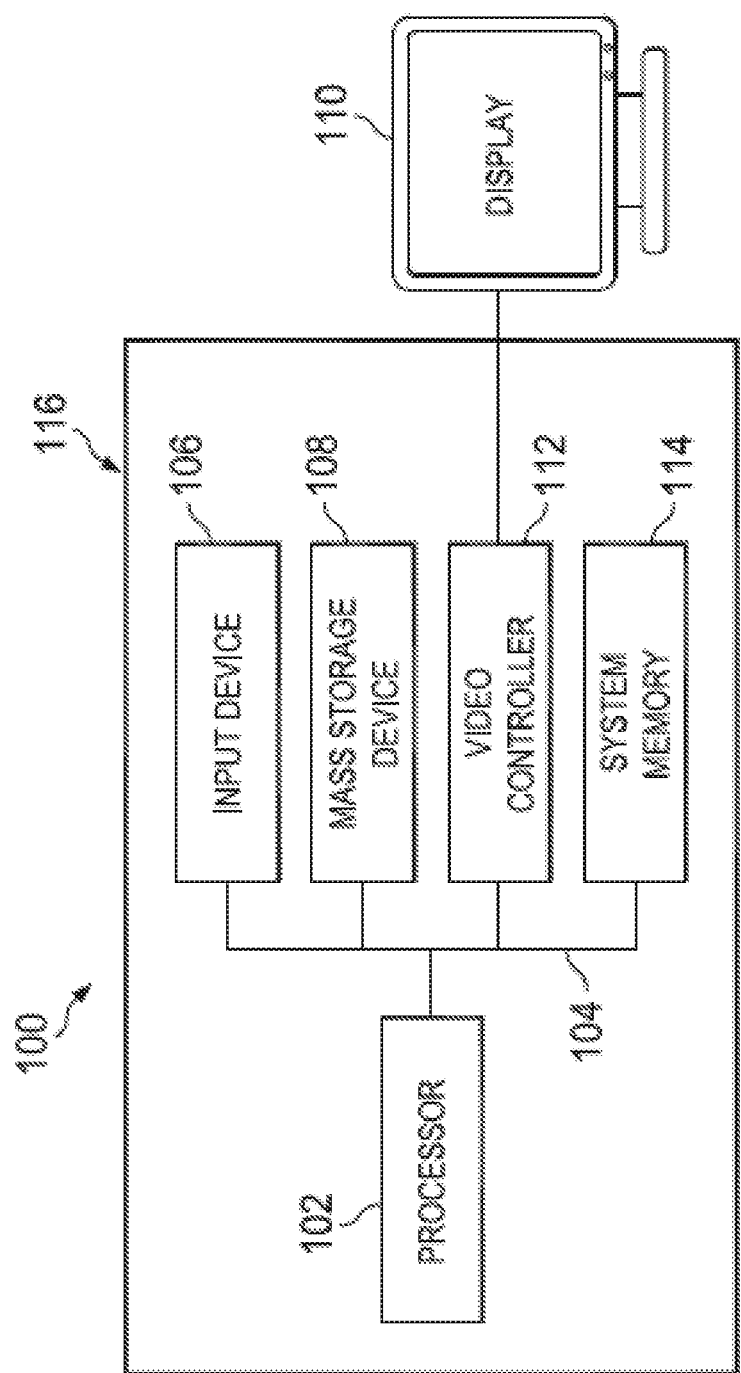
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
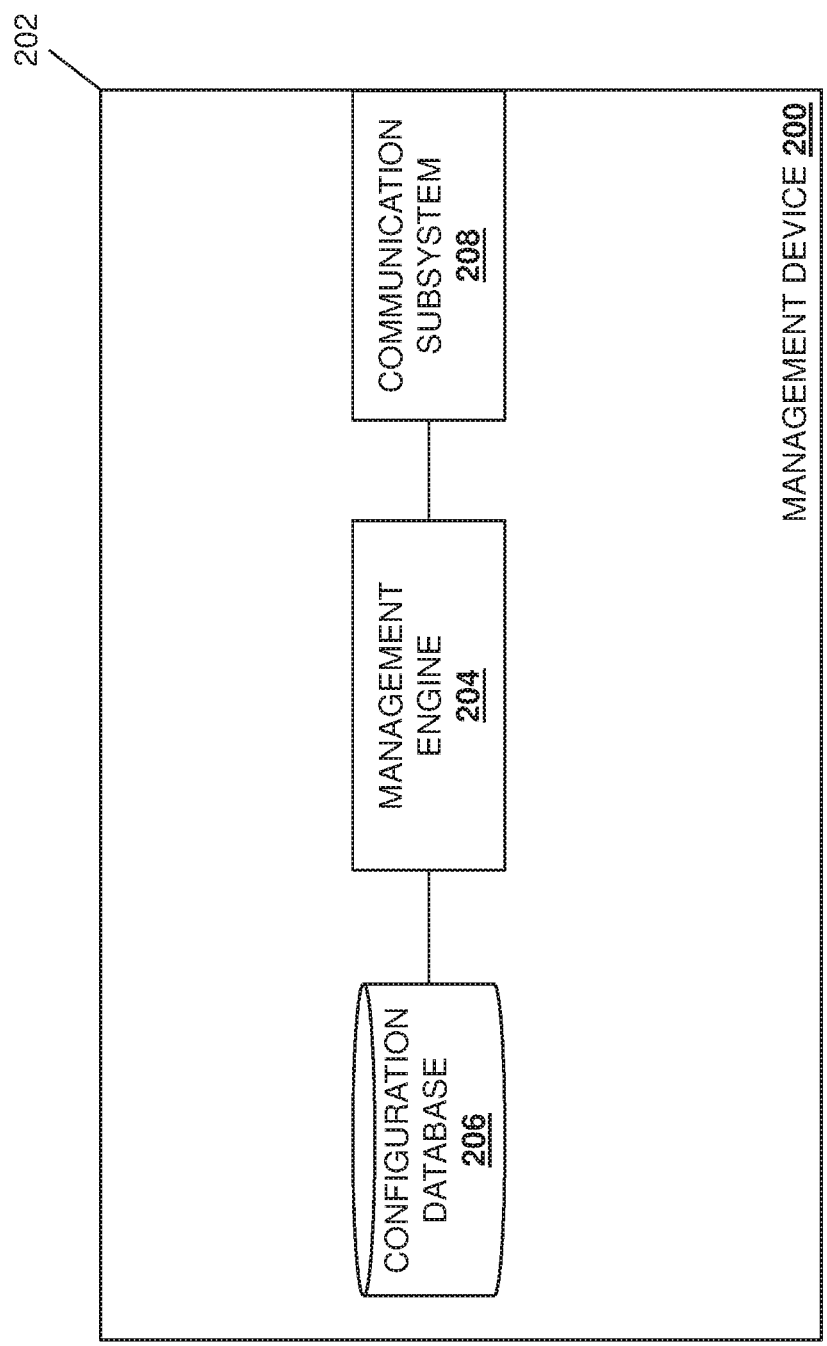
FIG. 2 is a schematic view illustrating an embodiment of a management device.

Referring now to FIG. 2, an embodiment of a management device 200 is illustrated that may be used in the coordinated network configuration systems discussed below. In some embodiments, the management device 200 may be the IHS 100 discussed above with reference to FIG. 1, and/or may include some or all of the components of the IHS. While the management device 200 is illustrated and described as a single management device (e.g., a server device, a desktop computer, a laptop/notebook computer, a tablet computer, a phone, and/or a variety of other management devices known in the art), the management device 200 may be provided by more than one device (e.g., a plurality of server devices or other computing devices) while remaining within the scope of the present disclosure. In the illustrated embodiment, the management device 200 includes a chassis 202 that houses the components of the management device 200, only some of which are illustrated in FIG. 2. For example, the chassis 202 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a management engine 204 that is configured to perform the functions of the management engines and management devices discussed below.

The chassis 202 may also house a storage system (not illustrated, but which may include the storage device 108 discussed above with reference to FIG. 1) that is coupled to the management engine 204 (e.g., via a coupling between the storage system and the processing system) and that includes a configuration database 206 that is configured to store the networking device configurations discussed below. The chassis 202 may also house a communication subsystem 208 that is coupled to the management engine 204 (e.g., via a coupling between the communication subsystem 208 and the processing system) and that may include a Network Interface Controller (NIC), a wireless communication subsystem (e.g., a WiFi subsystem, a Bluetooth subsystem, etc.), as well as ports or other connectors that are configured to connect to the management network discussed below. While a specific management device 200 has been illustrated and described, one of skill in the art in possession of the present disclosure will recognize that management devices may include a variety of components other than those described above and that provide for the performance of conventional management device functionality, as well as the functionality discussed below, while remaining within the scope of the present disclosure.

Figure 3:
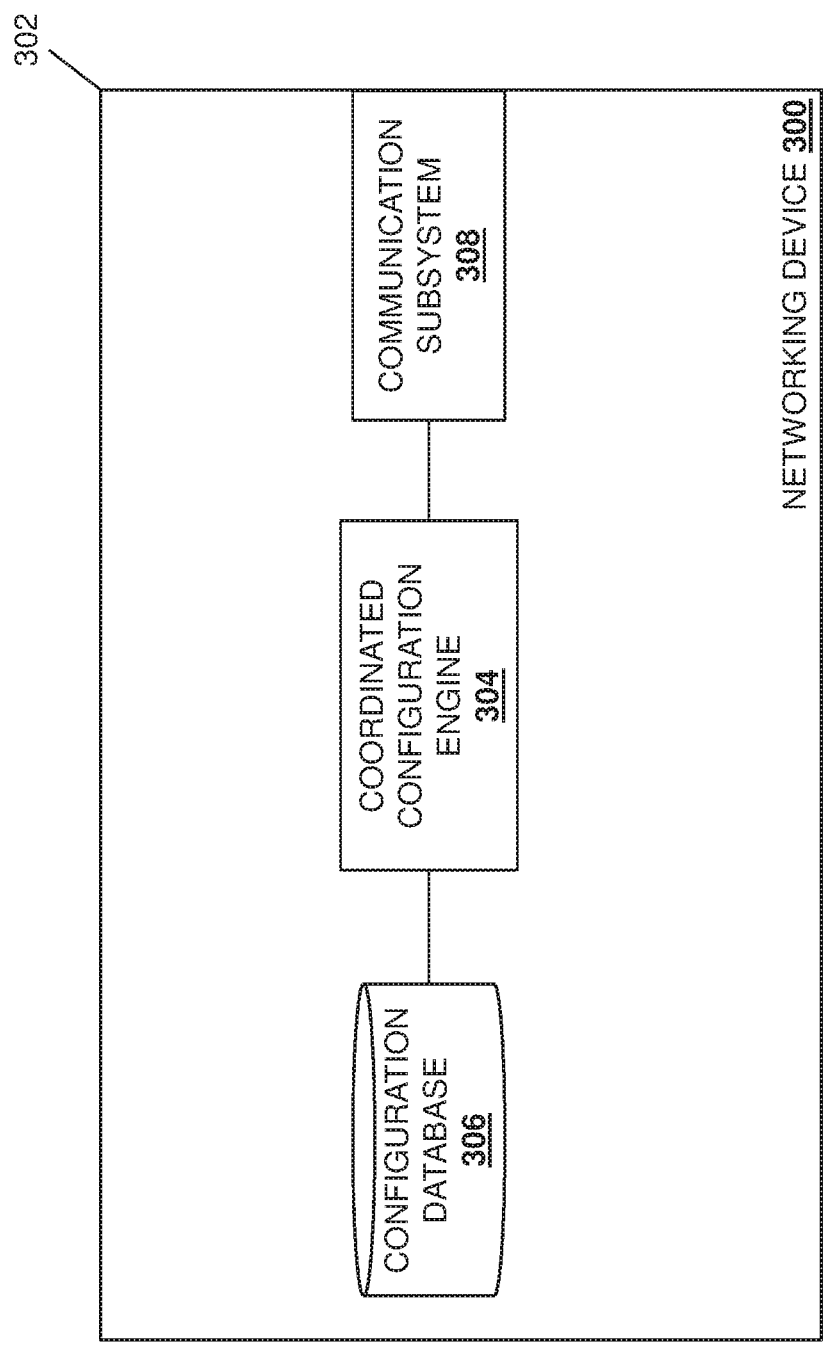
FIG. 3 is a schematic view illustrating an embodiment of a networking device.

Referring now to FIG. 3, an embodiment of a networking device 300 is illustrated that may be used in the coordinated network configuration systems discussed below. In some embodiments, the networking device 300 may be the IHS 100 discussed above with reference to FIG. 1, and/or may include some or all of the components of the IHS. While the networking device 300 is illustrated and described as a device that performs networking functionality (e.g., a switch device, a router device, an access point device, and/or a variety of other networking devices known in the art), one of skill in the art in possession of the present disclosure will recognize that other types of devices (e.g., server device, storage device, etc.) may benefit from the teachings of the present disclosure (i.e., may benefit from the coordinated configuration operations discussed below) and thus will fall within its scope. In the illustrated embodiment, the networking device 300 includes a chassis 302 that houses the components of the networking device 300, only some of which are illustrated in FIG. 3. For example, the chassis 202 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a coordinated configuration engine 304 that is configured to perform the functions of the coordinated configuration engines and networking devices discussed below. In a specific example, the coordinated configuration engine 304 may be provided by one or more container applications (e.g., JavaScript Object Notation (JSON) applications) that are provided in an application container and that operate within an operating system provided on the networking device 300.

The chassis 302 may also house a storage system (not illustrated, but which may include the storage device 108 discussed above with reference to FIG. 1) that is coupled to the coordinated configuration engine 304 (e.g., via a coupling between the storage system and the processing system) and that includes a configuration database 306 that is configured to store the networking device configurations discussed below. For example, the storage system may include a cache that provides the configuration database 306 discussed below. The chassis 302 may also house a communication subsystem 208 that is coupled to the coordinated configuration engine 304 (e.g., via a coupling between the communication subsystem 208 and the processing system) and that may include a Network Interface Controller (NIC), a wireless communication subsystem (e.g., a WiFi subsystem, a Bluetooth subsystem, etc.), as well as ports or other connectors that are configured to connect to the management network and/or the other networking devices discussed below. While a specific networking device 300 has been illustrated and described, one of skill in the art in possession of the present disclosure will recognize that networking devices and/or other computing devices may include a variety of components other than those described above and that provide for the performance of conventional networking device functionality and/or other computing device functionality, as well as the functionality discussed below, while remaining within the scope of the present disclosure.

Figure 4:
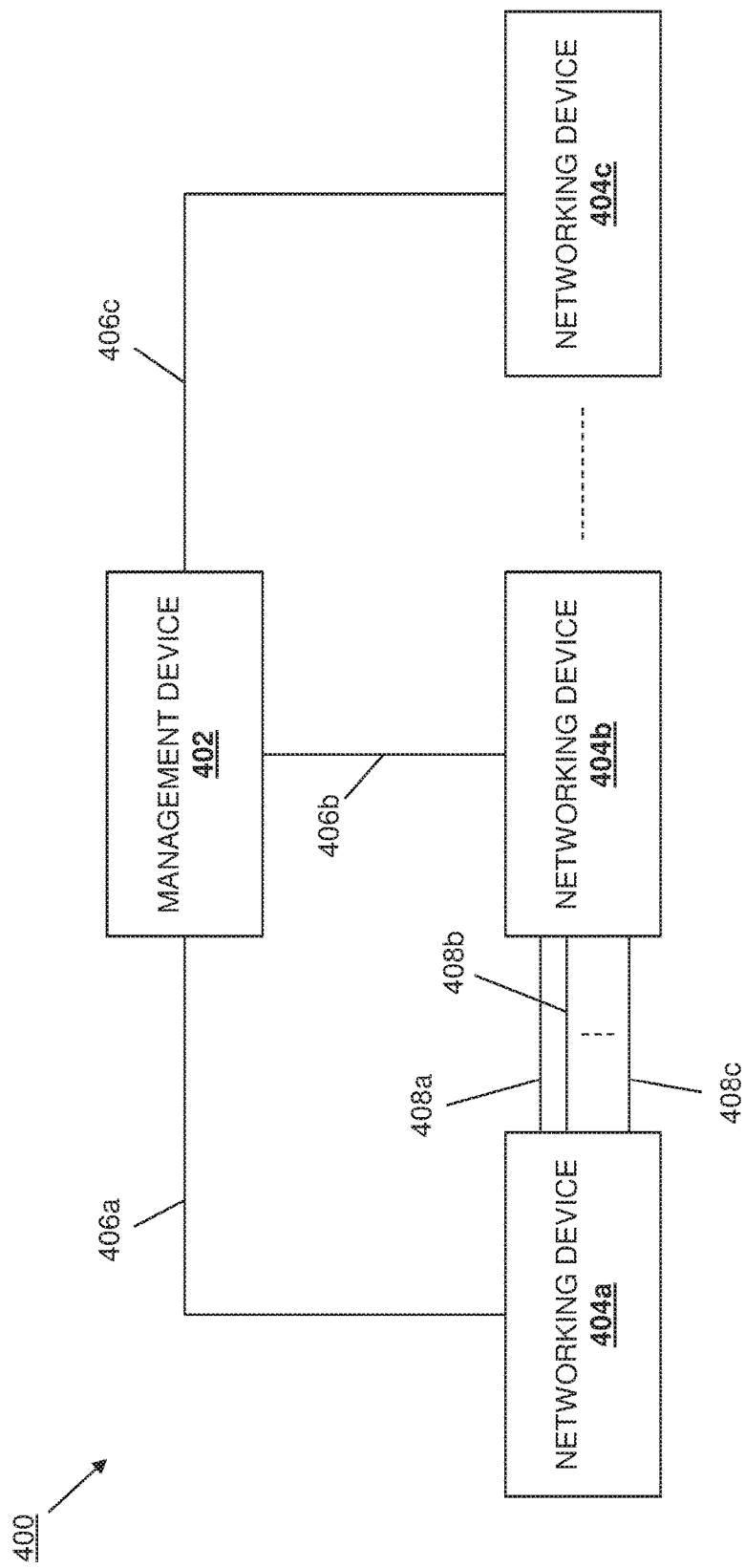
FIG. 4 is a schematic view illustrating an embodiment of a coordinated network configuration system.
Figure 5:
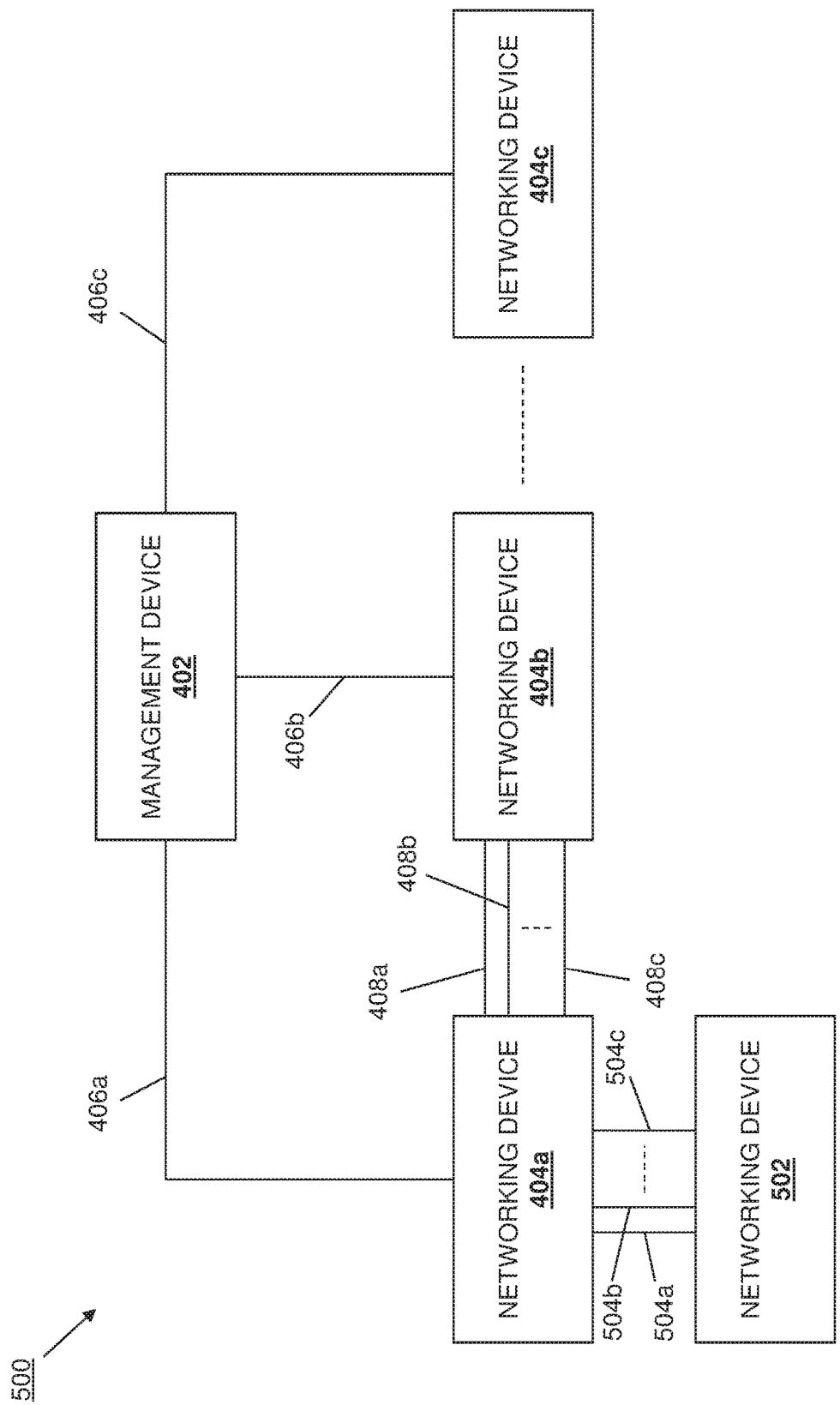
FIG. 5 is a schematic view illustrating an embodiment of a coordinated network configuration system.

Referring now to FIGS. 4 and 5, different embodiments of the coordinated network configuration system of the present disclosure are illustrated that include a coordinated network configuration system 400 that provides each of its networking devices with a direct connection to a management device, and a coordinated network configuration system 500 that provides at least one networking device without a direct connection to a management device. However, one of skill in the art in possession of the present disclosure will recognize that a variety of different network configurations that may include a variety of different devices may benefit from the teachings of the present disclosure and thus are envisioned as falling within its scope.

FIG. 4 illustrates the coordinated network configuration system 400 that includes a management device 402 that may be the management device 200 discussed above with reference to FIG. 2. As such, the management device 402 may be the IHS 100 discussed above with reference to FIG. 1, and/or may include some or all of the components of the IHS 100. In the illustrated embodiment, the management device 402 is coupled to a networking device 404a, a networking device 404b, and up to a networking device 404c, although one of skill in the art in possession of the present disclosure will recognize that the management device 402 may be coupled to a single networking device, or a different number of networking device than is illustrated, while remaining within the scope of the present disclosure. For example, one or more ports provided by the communication subsystem 208 in the management device 200/402 may be connected to one or more ports provided by the communication subsystems 308 in each of the networking devices 300/404a/404b/404c to provide respective management network connections 406a, 406b, and up to 406c that provide a management network (e.g., a network that provides for the management of the networking devices, as well as other data communications known in the art.) In an embodiment, the management network may be provided by in-band management networks, with the management network connections 406a-406c provided by in-band management network connections. However, in some embodiments, the utilization of out-of-band management networks and out-of-band management network connections may fall within the scope of the present disclosure as well.

In the illustrated embodiment, the networking device 404a is coupled to the networking device 404b, and one of skill in the art in possession of the present disclosure will recognize that any networking device in the coordinated network configuration system 400 may be coupled to any other networking device in the coordinated network configuration system 400 while remaining within the scope of the present disclosure. For example, one or more ports provided by the communication subsystem 308 in the networking device 300/404a may be connected to one or more ports provided by the communication subsystem 308 in the networking device 300/404b to provide respective links 408a, 408b, and up to 408c. However, one of skill in the art in possession of the present disclosure will recognize that networking devices may be coupled together in the coordinated network configuration system 400 by a single link, or a different number of links than is illustrated, while remaining within the scope of the present disclosure.

FIG. 5 illustrates the coordinated network configuration system 500 that is substantially similar to the coordinated network configuration system 400, and as such similar elements have been provided the same reference numbers. However, the coordinated network configuration system 500 illustrates how networking devices may be coupled to other networking devices that are not directly connected to the management device 402 via the management network (i.e., via a management network connection similar to the management network connections 406a-c). In the illustrated embodiment, the networking device 404a is coupled to a networking device 502 that is not directly connected to the management device 402 via the management network, and one of skill in the art in possession of the present disclosure will recognize that any networking device (e.g., any of the networking devices 404b and 404c) in the coordinated network configuration system 500 may be coupled to other networking devices that are not directly connected to the management device 402 via the management network while remaining within the scope of the present disclosure.

For example, one or more ports provided by the communication subsystem 308 in the networking device 300/404a may be connected to one or more ports provided by the communication subsystem 308 in the networking device 300/502 to provide respective links 504a, 504b, and up to 504c. However, one of skill in the art in possession of the present disclosure will recognize a networking device (which is directly connected to the management device 402 via the management network) may be coupled to a networking device (without a direct connection to the management device 402 via the management network) in the coordinated network configuration system 500 by a single link, or a different number of links than is illustrated, while remaining within the scope of the present disclosure. While the coordinated network configuration system 500 illustrates a networking device (i.e., the networking device 404a) directly connected to one other networking device (i.e., the networking device 502) that is not directly connected to the management device 402 via the management network, networking devices with direct connections to the management device 402 via the management network may be directly connected to or coupled to any number of other networking devices that are not directly connected to the management device 402 via the management network. For example, the networking device 404a may be directly connected to multiple networking devices (other than the networking device 502) that are not directly connected to the management device 402 via the management network. Furthermore, the networking device 502 may be directly connected to one or more networking devices that are not directly connected to the networking device 404a or the management device 402 via the management network, while each of those one or more networking devices may be connected to other networking devices that are not directly connected to the networking device 502, the networking device 404a, or the management device 402 via the management network, and so on.

Figure 6:
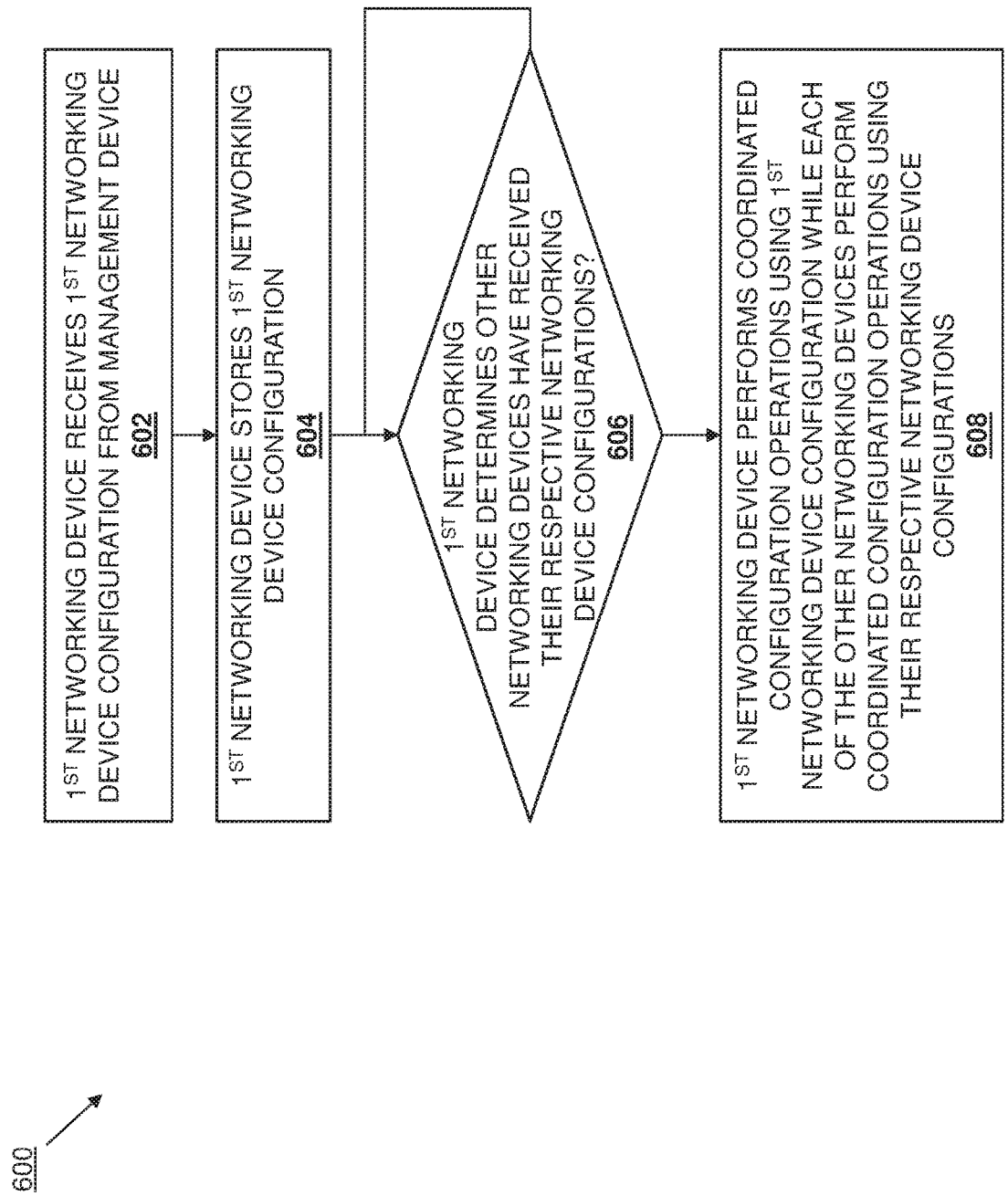
FIG. 6 is a flow chart illustrating an embodiment of a method for coordinated configuration of a network.
Figure 7:
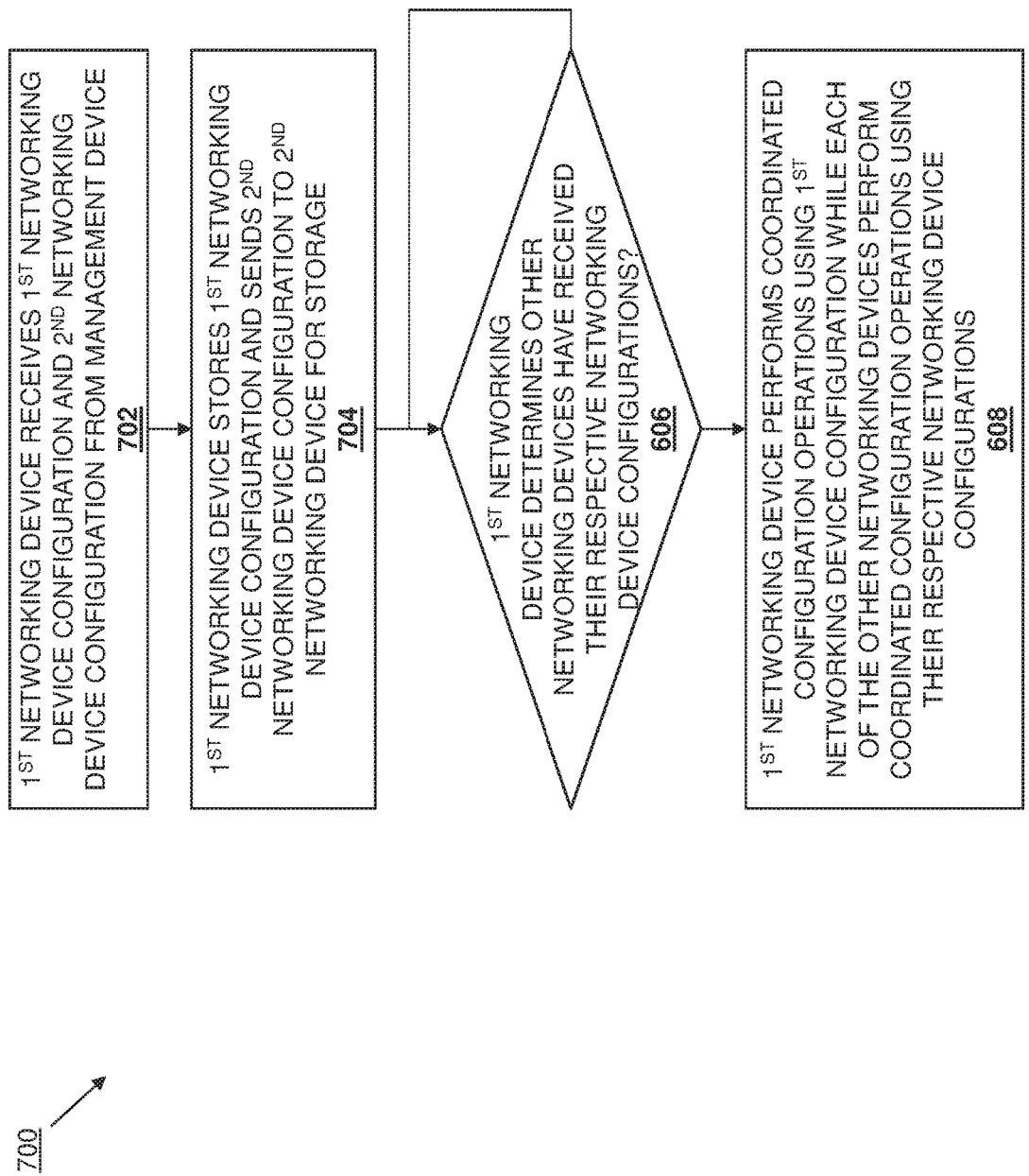
FIG. 7 is a flow chart illustrating an embodiment of a method for coordinated configuration of a network.
Figure 8:
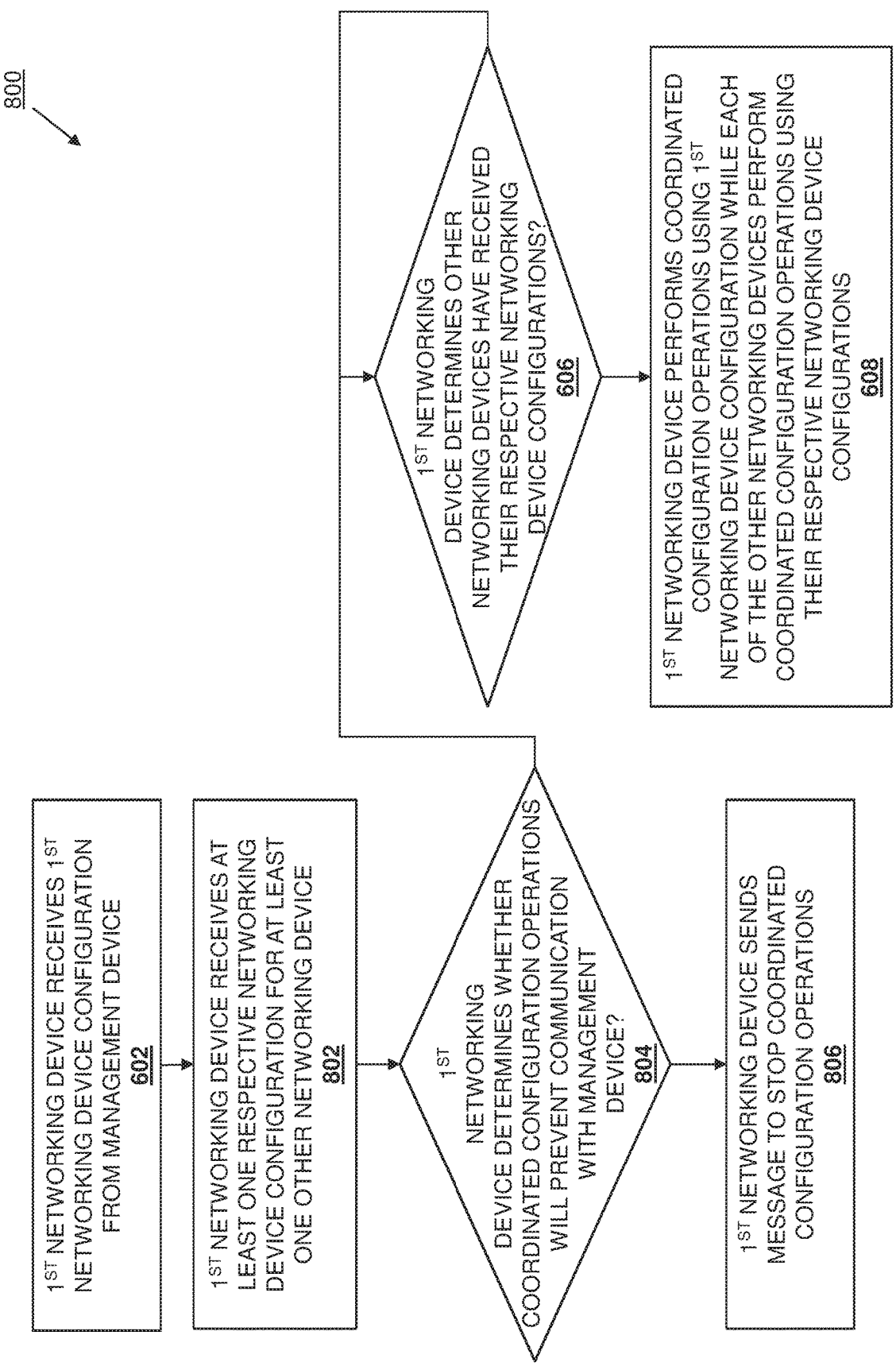
FIG. 8 is a flow chart illustrating an embodiment of a method for coordinated configuration of a network.

Referring now to FIGS. 6, 7, and 8, embodiments of methods for coordinated configuration of a network are illustrated. As discussed below, the systems of the present disclosure may operate according to the methods discussed below to provide a plurality of networking devices operating in a coordinated manner to apply at least a portion of their configurations at substantially the same time so that the network is completely configured remotely and without the need for user or administrator intervention. As discussed above, in a network deployment, configurations for networking devices may be dependent on configurations of other networking device, and those configurations may require that both networking devices maintain at least some continuity in their connectivity with each other and/or the management device throughout at least a portion of their configuration. Furthermore, conventional network management systems configure networking devices in a network deployment one-at-a-time, which raises issues, particularly when configuration commands operate to cause interface ports on the networking devices to shut down and/or lose communication capabilities with each other and/or the network management system. The systems of the present disclosure operate to remedy these and similar issues by providing respective configurations to each of the networking devices, and then having the networking devices apply those configurations in a coordinated manner. Furthermore, the networking devices may operate to analyze their configurations along with the configurations of other networking devices in the network to determine whether the application of those configurations may cause any issues that will require user or administrator intervention and, if an issue will arise, stop configuration operations and/or provide a warning of possible issues to the user or administrator before those configurations are applied.

In the discussions below, FIG. 6 provides an embodiment of a method 600 for coordinated configuration of a network in which each of a plurality of networking devices that are to-be configured includes a direct connection to a management device. In the discussions below, FIG. 7 provides an embodiment of a method 700 for coordinated configuration of a network in which at least one of a plurality of networking devices that are to-be configured does not include a direct connection to a management device. In the discussions below, FIG. 8 provides an embodiment of a method 800 for coordinated configuration of a network in which at least one of the networking devices that are to-be configured performs analysis of its networking device configuration, along with at least one other networking device configuration of at least one other networking device in the network, to determine whether coordinated configuration using those networking device configurations will result in remote configuration issues such as a loss of communication with a management device. However, one of skill in the art in possession of the present disclosure will recognize that some or all of the different methods discussed below may be combined to perform different combinations of the functionality discussed below while remaining within the scope of the present disclosure. In a specific example, prior to or as part of each of the methods 600, 700, and 800, the networking devices may have been installed and all cabling connected between those networking devices and the management device (e.g., as per a network diagram), with the networking devices powered on or otherwise initialized and operating in a default configuration that provides their communication subsystem ports in an access port mode without any link aggregation.

Referring to FIGS. 4 and 6, the method 600 begins at block 602 where a first networking device receives a first networking device configuration from a management device. In an embodiment, at block 602, the management engine 204 in the management device 200/402 may operate to identify a networking device configuration for the networking device 404a, then receive, generate, or retrieve that networking device configuration (e.g., from its configuration database 206), and transmit that networking device configuration over the management network connection 406a via its communication subsystem 208 to the networking device 404a. In response, at block 602 the coordinated configuration engine 304 in the networking device 300/404a may receive that networking device configuration through the management network connection 406a via its communication subsystem 308. In a specific example, each of the networking devices 404a-404c may be Internet Protocol (IP) addressable, and any of a variety of secure protocols (e.g., HyperText Transport Protocol Secure (HTTPS)) may be used to implement a secure connection with the management device 402 for transmittal of the networking device configurations.

Similarly, at block 602, the management engine 204 in the management device 200/402 may operate to identify networking device configurations for each of the networking devices in the network (e.g., networking devices 404b and up to 404c), then receive, generate, or retrieve those networking device configurations (e.g., from its configuration database 206), and transmit those networking device configurations over the management network connections (e.g., the management connections 406b and up to 406c, respectively) via its communication subsystem 208 to the networking devices (e.g., the networking devices 404b and up to 406c.) In response, at block 602 the coordinated configuration engines 304 in the networking devices 300 (e.g., the networking devices 404a and up to 404b) may receive those networking device configurations, respectively, through their management network connections (e.g., the management network connections 406b and up to 406c) via their communication subsystems 308. In an embodiment, each networking device configuration provided to respective networking devices at block 602 may include the entire command set required to completely configure that networking device. However the provisioning of partial command sets at block 602 are envisioned as falling within the scope of the present disclosure as well.

In some embodiments, the networking device configurations provided by the management device 402 to the networking devices 404a-404c may each be different (e.g., a first networking device configuration may be provided to a first networking device, a second networking device configuration may be provided to a second networking device, etc.). However, in other embodiments, some or all of the networking device configurations provided by the management device 402 to the networking devices 404a-404c may be the same (e.g., a first networking device configuration provided to a first networking device may be the same as a second networking device configuration provided to a second networking device such that two or more of the networking devices 404a-404c may receive the same networking device configuration). Furthermore, while each of the networking devices 404a-c is discussed as receiving its respective networking device configuration via its dedicated management network connection 406a-406c, respectively, networking devices (e.g., the networking device 404a) may receive (from the management device 402) a networking device configuration for another networking device that may have a dedicated management network connection (e.g., the networking device 404b with the management network connection 406b), and then forward that networking device configuration to that other networking device while remaining within the scope of the present disclosure.

In many embodiments, at block 602, each networking device receiving a networking device configuration may operate to verify that it has received an authorized, complete, and/or otherwise valid networking device configuration. For example, at block 602, the coordinated configuration engine 304 in the networking device 300/404a may operate to verify a checksum that was provided with its networking device configuration by the management device 402. In response to validating the checksum provided with its networking device configuration, the coordinated configuration engine 304 in the networking device 300/404a may proceed to block 604 of the method 600.

However, in response to determining that the checksum provided with its networking device configuration is not valid, the coordinated configuration engine 304 in the networking device 300/404a may discard the networking device configuration received at block 602 and/or send a request to the management device 402 (e.g., via its management network connection 406a) to resend its networking device configuration (or a portion of its networking device configuration), and one of skill in the art in possession of the present disclosure will recognize that the process of validating the checksum in a received networking device configuration and requesting resending of networking device configurations may be repeated until a valid networking device configuration (e.g., a networking device configuration with a valid checksum) is received, or the operation times out. While only the networking device 404a has been described as validating its networking device configuration, one of skill in the art in possession of the present disclosure will recognize that any of the networking devices 404b-404c may operate in substantially the same manner while remaining within the scope of the present disclosure. Furthermore, while checksum operations have been described for use in validating networking device configurations, other networking device configuration and/or data structure validation techniques are envisioned as falling within the scope of the present disclosure as well. In a specific example, if any networking device in the coordinated network configuration system 400 determines that it has not received a valid networking device configuration (e.g., it has not received a full command set) due to a loss of communication or other issue, that networking device may send a request to resume transmittal of that networking device configuration from the point when communication was lost so that the remainder of the command set is retrieved, or request a resend of the entire command set.

The method 600 then proceeds to block 604 where the first networking device stores the first networking device configuration. In an embodiment, at block 604 the coordinated configuration engine 304 in the networking device 300/404a may operate to store the networking device configuration (which it received from the management device 402 at block 602) in its configuration database 306. For example, the coordinated configuration engine 304 in the networking device 300/404a may operate to cache the networking device configuration at block 604. Similarly, at block 604, the coordinated configuration engines 304 in the other networking devices in the network (e.g., the networking devices 404b and up to 404c) may operate to store the networking device configuration (which they received from the management device 402 at block 602) in their configuration databases 306. As such, in some embodiments, following the receipt of a valid networking device configuration, each of the networking devices 404a-404c in the coordinated network configuration system 400 may operate to store those networking device configurations (e.g., in their respective configuration databases 306.)

The method 600 then proceeds to decision block 606 where the first networking device determines whether other networking devices have received their respective networking device configurations. In some embodiments, the coordinated configuration engine 304 in each networking device 300 may operate, upon receiving and/or storing its networking device configuration at blocks 602 and/or 604, to start a timer. At decision block 606, the coordinated configuration engine 304 in each networking device 300 may then determine whether some period of time has elapsed following the start of that timer in order to determine whether the other networking devices in the coordinated network configuration system 400 have received their respective networking device configurations. For example, the management engine 204 in the management device 200/402 may provide a predetermined time period along with each networking device configuration that is provisioned at block 602, and that predetermined time period may be a time period that has been provided to (or determined by) the management engine 204 to be a time period within which each of the networking devices 404a-404c should receive their respective networking device configurations (and, in some situations, may take into account the time needed to request resending of networking device configurations in the event one or more of the networking devices 404a-404c receives an invalid networking device configuration, discussed above.) In another example, the period of time that must elapse following the start of the timer (i.e., to determine that the other networking devices have received their respective networking device configurations) may be provided to or determined by the coordinated configuration engines 304 in the networking devices 300). As such, at decision block 606, each networking device 404a-404c may determine whether the other networking devices in the coordinated network configuration system 400 have received their respective networking device configurations if a time period has passed following the receipt and/or storage of its networking device configuration provided by the management device 402.

In other embodiments, the coordinated configuration engine 304 in each networking device 300 may operate, upon receiving and/or storing its networking device configuration at blocks 602 and/or 604, to send a networking device configuration confirmation message. For example, the coordinated configuration engine 304 in the networking device 300/404a may receive and/or store its respective networking device configuration and, in response, may send a networking device configuration confirmation message through the management network connection 406a via its communication subsystem 308 to the management device 402. In response, the management engine 204 in the management device 200/402 may receive the networking device configuration confirmation message from the networking device 404a through the management network connection 406a via its communication subsystem 208. While only the networking device 404a has been described as sending a networking device configuration confirmation message in response to receiving and/or storing its respective networking device configuration, one of skill in the art in possession of the present disclosure will recognize that any of the networking devices 404b-404c may operate in substantially the same manner while remaining within the scope of the present disclosure.

In response to receiving the networking device configuration confirmation messages from the networking device(s) 404a-404c, the management engine 204 may operate to send coordinated configuration initiation messages to the networking device(s) 404a-404c. In an embodiment, the management engine 204 in the management device 200/402 may determine that it has received (e.g., via its communication subsystem 208) a networking device configuration confirmation message from each of the networking devices 404a-404c in the coordinated network configuration system 400 and, in response, send (e.g., via its communication subsystem 208) a coordinated configuration initiation message to each of those networking devices 404a-404c via their respective management network connections 406a-406c. However, in another embodiment, the management engine 204 in the management device 200/402 may determine that it has received (e.g., via its communication subsystem 208) a networking device configuration confirmation message from some subset of the networking devices 404a-404c in the coordinated network configuration system 400 and, in response, send (e.g., via its communication subsystem 208) a coordinated configuration initiation message to that subset of the networking devices 404a-404c via their respective management network connections. For example, the management engine 204 in the management device 200/402 may determine it has received networking device configuration confirmation messages from a subset of networking devices, may determine that the configuration of that subset of networking devices (using their respective networking device configurations) will not cause any issues with the network (e.g., will not prevent communication between the management device 402 and any networking device in the coordinated network configuration system 400) and, in response, send coordinated configuration initiation messages to that subset of the networking devices substantially as described above.

Furthermore, in some embodiments, the coordinated configuration engine 304 in one or more of the networking devices 300 may operate, upon receiving and/or storing its networking device configuration at blocks 602 and/or 604, to send a coordinated configuration initiation message to other networking devices in the coordinated network configuration system 400 (i.e., the networking devices 404a-404c may confirm receipt of their networking device configurations independent from the management device 402.) For example, the coordinated configuration engine 304 in the networking device 300/404a may receive and/or store its respective networking device configuration and, in response, may send a coordinated configuration initiation message through the one or more links 408-408c via its communication subsystem 308 to the networking device 404b. In response, the coordinated configuration engine 304 in the networking device 300/404b may receive the coordinated configuration initiation message from the networking device 404a via its communication subsystem 308. While only the networking devices 404a and 404b have been described as sending and receiving, respectively, a coordinated configuration initiation message, one of skill in the art in possession of the present disclosure will recognize that any of the networking devices 404b-404c may operate in substantially the same manner while remaining within the scope of the present disclosure.

In an embodiment, at decision block 606, the coordinated configuration engine 304 in each networking device 300 may then determine whether it has received a coordinated configuration initiation message in order to determine whether the other networking devices in the coordinated network configuration system 400 have received their respective networking device configurations. For example, the coordinated configuration engine 304 in the networking device 300/404a may determine that it has received (e.g., through its communication subsystem 308) a coordinated configuration initiation message (e.g., from the management device 402 or other networking device) and, in response, determine at decision block 606 that the other networking devices in the coordinated network configuration system 400 have received their respective networking device configurations. As such, at decision block 606, each networking device 404a-404c may determine whether the other networking devices in the coordinated network configuration system 400 have received their respective networking device configurations if they receive a respective coordinated configuration initiation message (e.g., from the management device 402 or another networking device.)

If, at decision block 606, the first networking device determines that other networking devices have not received their respective networking device configurations, the method 600 returns to decision block 606. For example, the coordinated configuration engine 304 in the any of the networking devices 404a-404c may determine that a time period has not passed since the receipt and/or storage of its networking device configuration and, in response, may return to decision block 606 to wait for that time period to pass. In another example, the coordinated configuration engine 304 in the any of the networking devices 404a-404c may determine that no coordinated configuration initiation message has been received (e.g., from the management device 402 or another networking device) and, in response, may return to decision block 606 to wait for a coordinated configuration initiation message to be received. While the method 600 is illustrated as looping back through decision block 606 repeatedly until the first networking device determines that the other networking devices have received their respective networking device configurations, one of skill in the art in possession of the present disclosure will recognize that the method 600 may time out (and, for example, end without configuration of some or all the networking devices) if the method 600 loops back through decision block 606 a predetermined number of times (or for a predetermined amount of time).

If, at decision block 606, the first networking device determines that other networking devices have received their respective networking device configurations, the method 600 then proceeds to block 608 where the first networking device performs coordinated configuration operations using its first networking device configuration while each of the other networking devices perform coordinated configuration operations using their respective networking device configurations. In an embodiment, the coordinated configuration engine 304 in the networking device 404a may determine that a time period has passed since the receipt and/or storage of its networking device configuration and, in response, may proceed to block 608 to perform coordinated configuration operations using its networking device configuration. Furthermore, the coordinated configuration engines 304 in the networking devices 404b and 404c may determine that a time period has passed since the receipt and/or storage of their networking device configurations and, in response, may proceed to block 608 to perform coordinated configuration operations using their networking device configurations. In another embodiment, the coordinated configuration engine 304 in the networking device 404a may determine that it has received a coordinated configuration initiation message and, in response, may proceed to block 608 to perform coordinated configuration operations using its networking device configuration. Furthermore, the coordinated configuration engines 304 in the networking devices 404b and 404c may determine that they have received respective coordinated configuration initiation messages and, in response, may proceed to block 608 to perform coordinated configuration operations using their networking device configurations.

Coordinated configuration operations may involve each of the networking devices 404a-404c, or a subset of the networking devices 404a-404c (e.g., the subset of networking devices 404a-404c that received the coordinated configuration initiation messages, discussed above), applying their respective networking device configurations at the same time, or at substantially the same time. Furthermore, coordinated configuration operations may be preceded or followed by the application of other configuration elements or the performance of other configuration operations that may not require the coordinated configuration that applies networking device configurations at the same time or substantially the same time. In an embodiment, the application of networking device configurations during coordinated configuration operations may include the configuration, by a plurality of networking devices, of one or more links between those networking devices at the same time or substantially the same time such that the configuration of those one or more links is completed without the need for user or administrator intervention. For example, at block 608, the coordinated configuration engine 304 in the networking device 300/404a may operate to configure some subset of the plurality of links 408a, 408b, and up to 408c at the same time, or at substantially the same time, as the coordinated configuration engine 304 in the networking device 300/404b operates to configure that same subset of the plurality of links 408a, 408b, and up to 408c. As such, coordinated configuration at substantially the same time may include application of any or all of networking device configuration command sets by multiple networking devices in a manner that completes the configuration provided by those networking device configuration command sets without the need for manual intervention by a user or administrator with those networking devices, when the application of any or all of networking device configuration command sets by the multiple networking devices at different times would not result in the completion of the configuration provided by those networking device configuration command sets without the need for manual intervention by a user or administrator with those networking devices In a specific example, the networking devices 404a and 404b may perform coordinated configuration operations to configure each of a subset of the plurality of links 408a, 408b, and up to 408c into a Link Aggregation Group (LAG). However, other coordinated configuration operations may include assigning port(s) to a Virtual Local Area Network (VLAN), designating port(s) as trunking ports, configuring Maximum Transmission Unit (MTU) sizes, applying Spanning Tree Protocol (STP) characteristics, and/or performing a variety of other networking device configurations known in the art. Furthermore, any of the networking devices 404a-404c may operate to perform similar coordinated configuration operations at block 608 while remaining within the scope of the present disclosure. Further still, before and/or after the performance of the coordinated configuration operations at block 608, any or all of the coordinated configuration engines 304 in the networking devices 300/404a may operate to perform other configuration operations (e.g., the other configuration operations that may not require coordinated configuration that applies networking device configurations at the same time or substantially the same time, discussed above) while remaining within the scope of the present disclosure.

Thus, the method 600 provides for the distribution of networking device configurations to a plurality of networking devices (e.g., via their direct management network connections to a management device), and the application of at least a portion of those networking device configurations by those networking devices in a coordinated manner such that those portions of networking device configurations are applied to those networking devices at the same time or substantially the same time. The application of the networking device configurations to respective networking devices at the same or substantially the same time is performed in order to apply those configurations while not causing issues such as the disablement of communications between those networking devices and/or the management device in a manner that prevents the remaining configuration of those (or other) networking devices in the network. As such, the coordinated configuration performed using at least a portion of the networking device configurations may be designed such that even if coordinated configuration operations temporarily disable communications, they do so in a way that does not prevent the completion of the configuration of the network without the need for user or administrator intervention (i.e., an automated remote network configuration.)

Referring now to FIGS. 5 and 7, another embodiment of the methods of the present disclosure is illustrated. The method 700 begins at block 702 where a first networking device receives a first networking device configuration and a second networking configuration from a management device. In an embodiment, at block 702, the management engine 204 in the management device 200/402 may operate to identify networking device configurations for the networking device 404a and the networking device 502, then receive, generate, or retrieve those networking device configurations (e.g., from its configuration database 206), and transmit those networking device configurations over the management network connection 406a via its communication subsystem 208 to the networking device 404a. In response, at block 602 the coordinated configuration engine 304 in the networking device 300/404a may receive those networking device configurations through the management network connection 406a via its communication subsystem 308.

At block 702, the management device may determine whether a directly connected first networking device is connected to a second networking device that does not have a direct connection to the management device 402 and, in response, determine that the first networking device should receive networking device configurations for itself and the second networking devices. Thus, using the coordinated network configuration system 500 illustrated in FIG. 5, the management engine 204 in the management device 402 may determine that the networking device 404a with the direct management network connection 406a is connected to the networking device 502 without a direct connection to the management device 402 and, in response, retrieve and transmit networking device configurations for the networking device 404a and the networking device 502 to the networking device 404a. Similarly, networking device configurations for networking devices connected to the networking devices 404b-404c (but with no direct connection to the management device 402) may be provided to those networking device 404b-404c in the same manner. Furthermore, networking device configurations for networking devices that are connected to networking devices with no direct connection to the management device 402 (e.g., for a networking device connected to the networking device 502, not illustrated) may be provided in the same manner (e.g., provided to the networking device 404a, which then provides that networking device configuration to the networking device 502, which then provides that networking device configuration to the networking device to which it is to-be applied.)

Similarly as discussed above, at block 702, the management engine 204 in the management device 200/402 may operate to identify networking device configurations for each of the networking devices in the network (e.g., networking devices 404b and up to 404c), then receive, generate, or retrieve those networking device configurations (e.g., from its configuration database 206), and transmit those networking device configurations over the management network connections (e.g., the management connections 406b and up to 406c, respectively) via its communication subsystem 208 to the networking devices (e.g., the networking devices 404b and up to 406c.) In response, at block 702 the coordinated configuration engines 304 in the networking devices 300 (e.g., the networking devices 404a and up to 404b) may receive those networking device configurations, respectively, through their management network connections (e.g., the management network connections 406b and up to 406c) via their communication subsystems 308. As discussed above, the networking device configurations provided by the management device 402 to the networking devices 404a-404c and 502 may each be different (e.g., a first networking device configuration may be provided to a first networking device, a second networking device configuration may be provided to a second networking device, etc.). However, in other embodiments, some or all of the networking device configurations provided by the management device 402 to the networking devices 404a-404c and 502 may be the same (e.g., two or more of the networking devices 404a-404c and 502 may receive the same networking device configuration). Furthermore, while each of the networking devices 404a-c is discussed as receiving its respective networking device configurations via its dedicated management network connection 406a-406c, respectively, networking devices may receive (from the management device 402) a networking device configuration for another networking device that may have a dedicated management network connection, and then forward that networking device configuration to that other networking device while remaining within the scope of the present disclosure.

In many embodiments, at block 702, each networking device receiving a networking device configuration may operate to verify that it has received an authorized, complete, and/or otherwise valid networking device configuration. For example, at block 702, the coordinated configuration engine 304 in the networking device 300/404a may operate to verify checksums provided with its networking device configurations by the management device 402. In response to validating the checksums provided with its networking device configurations, the coordinated configuration engine 304 in the networking device 300/404a may proceed to block 604 of the method 600.

However, in response to determining that the checksums provided with one or more of its networking device configuration(s) are not valid, the coordinated configuration engine 304 in the networking device 300/404a may discard those networking device configuration(s) received at block 602 and/or send a request to the management device 402 (e.g., via its management network connection 406a) to resend one or more networking device configuration(s), and one of skill in the art in possession of the present disclosure will recognize that the process of validating the checksum in a received networking device configuration and requesting resending of networking device configurations may be repeated until a valid networking device configuration (e.g., a networking device configuration with a valid checksum) is received, or the operation times out. While only the networking device 404a has been described as validating multiple networking device configurations (e.g., one for itself, and one for the networking device 502), one of skill in the art in possession of the present disclosure will recognize that any of the networking devices 404b-404c may operate in substantially the same manner (e.g., with a connected networking device similar to the networking device 502) while remaining within the scope of the present disclosure. Furthermore, while checksum operations have been described for use in validating networking device configurations, other networking device configuration and/or data structure validation techniques are envisioned as falling within the scope of the present disclosure as well.

The method 700 then proceeds to block 704 where the first networking device stores the first networking device configuration and sends the second networking device configuration to a second networking device for storage. In an embodiment, the networking device 404a may operate to store its networking device configuration in substantially the same manner as discussed above, while operating to send a networking device configuration to the networking device 502. For example, the coordinated configuration engine 304 in the networking device 300/404a may operate to send the networking device configuration for the networking device 502 (i.e., that was received from the management device 402) through its communication subsystem 308 and via the one or more of the links 504a-504c to the networking device 502. In response, the coordinated configuration engine 304 in the networking device 300/502 may receive that networking device configuration via its communication subsystem 308 and store that networking device configuration in its configuration database 306. While the networking device 404a is illustrated and described as providing a networking device configuration (received from the management device 402) to a single networking device 502, any number of the networking devices in the coordinated network configuration systems of the present disclosure may rely on each other to ensure that networking device configurations are forwarded across any number of networking devices (e.g., using signature/receipt/notification techniques known in the art) to be provided for application on a desired networking device.

In some examples, rather than having the networking device 404a verify the networking device configuration that was provided for the networking device 502 at block 702, the coordinated configuration engine 304 in the networking device 300/502 may operate to verify a checksum that was provided with its networking device configurations by the management device 402. In response to validating the checksum provided with its networking device configuration, the coordinated configuration engine 304 in the networking device 300/502 may proceed to decision block 604 of the method 600. However, in response to determining that the checksum provided with its networking device configuration is not valid, the coordinated configuration engine 304 in the networking device 300/502 may discard that networking device configuration received at block 704 and/or send a request to the networking device 404a (for forwarding to the management device 402 via its management network connection 406a) to resend the networking device configuration, and one of skill in the art in possession of the present disclosure will recognize that this process of validating the checksum in a received networking device configuration and requesting resending of networking device configurations may be repeated until a valid networking device configuration (e.g., a networking device configuration with a valid checksum) is received, or the operation times out.

The method 700 then proceeds to decision block 606 where the first networking device determines whether other networking devices have received their respective networking device configurations in substantially the same manner as discussed above with reference to the method 600. In many embodiments, the networking device 502 may operate at decision block 606 substantially as discussed above to determine whether a time period has passed since receiving and/or storing its networking device configuration in order to determine whether the other networking devices have received their respective networking device configurations. Furthermore, in some embodiments, the networking device 502 may operate substantially as discussed above to send network device configuration confirmation messages to the networking device 404a (for forwarding to the management device 402 via its management network connection 406a). Further still, the networking device 404a may operate to forward coordinated configuration initiation messages (received from the management device 402 via its management network connection 406a) to the networking device 502, and the networking device 502 may operate to determine whether a coordinated configuration initiation message has been received in order to determine whether the other networking devices have received their respective networking device configurations.

If, at decision block 606, the first networking device determines that other networking devices have not received their respective networking device configurations, the method 600 returns to decision block 606 in substantially the same manner as discussed above with reference to the method 600. As such, if the coordinated configuration engine 304 in the networking device 300/502 determines that the other networking devices have not received their respective networking device configurations, the method 600 may loop back through decision block 606 substantially as discussed above. If, at decision block 606, the first networking device determines that other networking devices have received their respective networking device configurations, the method 600 then proceeds to block 608 where the first networking device performs coordinated configuration operations using its first networking device configuration while each of the other networking devices perform coordinated configuration operations using their respective networking device configurations in substantially the same manner as discussed above with reference to the method 600. As such, at block 608 the networking device 404a and the networking device 502 may perform coordinated configuration operations in substantially the same manner as discussed above.

As discussed above, conventional network configuration techniques may result in issues when configuring links between networking devices into a LAG, as configuration commands will cause the ports on a first networking device to "go down" in order to form the LAG, and then wait for the configuration of the ports on the second networking device (which provide the corresponding plurality of links to the first networking device) in the LAG. Then, when the network management system attempts to provide the second networking device a second configuration (i.e., that would configure the ports on the second networking device to provide their corresponding links in the LAG), it will be unable to do so because the port on the first networking device that provide the management link to the second switch is "down" and waiting for the configuration of the second switch port that provides that management link. However, the coordinated network configuration system 400 solves such issues by providing each of the networking devices 404a and 502 their respective networking device configurations prior to performing configuration operations, and then performs coordinated configuration operations to configure at least a subset of the links 504a-504c into a LAG at the same time (or substantially the same time) such that communication between the management device 402 and the networking device 502 is not disabled in a manner that prevents the completion of the configuration of the subset of links 504a-504c. For example, the coordinated configuration operations by the networking device 404a and the networking device 502 may cause ports that provide either side of any of the links 504a-504c to "go down" and thus prevent communications, but because the application of the networking device configurations is occurring at the same or substantially the same time, those ports on either side of any of the links 504a-504c will "come up" and see a matching port configuration opposite their link so that communications are once again enabled.

Thus, the method 700 provides for the distribution of networking device configurations to a plurality of networking devices (e.g., including at least one networking device without a direct management network connection to a management device), and the application of at least a portion of those networking device configurations by those networking devices in a coordinated manner such that those portions of networking device configurations are applied to those networking devices at the same time or substantially the same time. The application of the networking device configurations to respective networking devices at the same or substantially the same time is performed in order to apply those configurations while not causing issues such as the disablement of communications between those networking devices and the management device in a manner that prevents the remaining configuration of those (or other) networking devices in the network. As such, the coordinated configuration performed using at least a portion of the networking device configurations may be designed such that even if coordinated configuration operations temporarily disable communications, they do so in a way that does not prevent the completion of the configuration of the network without the need for user or administrator intervention (i.e., an automated remote network configuration.)

Referring now to FIG. 8, another embodiment of the methods of the present disclosure is illustrated. The method 800 begins at block 602 where a first networking device receives a first networking device configuration from a management device in substantially the same manner as discussed above with reference to the method 600. The method 800 then proceeds to block 802 where the first networking device receives at least one respective networking device configuration for at least one other networking device. In some embodiments, at block 802 the networking device(s) may receive the at least one respective networking device configuration for the at least one other networking device from the management device 402. For example, the management engine 204 in the management device 200/402 may retrieve networking device configurations for the networking devices 404a and 502 from its configuration database 206, and provide those networking device configurations through the management network connection 406a (via its communication subsystem 208) to the networking device 404a. As such, at block 802 the coordinated configuration engine 304 in the networking device 300/404a may receive the networking device configurations for itself and the networking device 502 through its communication subsystem 308.

In other embodiments, at block 802 the networking device(s) may receive the at least one respective networking device configuration for the at least one other networking device from those networking device(s). For example, the management engine 204 in the management device 200/402 may retrieve a networking device configuration for the networking device 404b from its configuration database 206 and provide that networking device configuration through the management network connection 406b (via its communication subsystem 208) to the networking device 404b. The coordinated configuration engine 304 in the networking device 300/404b may then send that networking device configuration through one or more of the links 408a-408c to the networking device 404a. As such, at block 802 the coordinated configuration engine 304 in the networking device 300/404a may receive the networking device configuration for the networking device 404b through its communication subsystem 308.

In different embodiments, any networking device in the coordinated network configuration systems 400 and/or 500 may receive networking device configurations for one or more networking devices at block 802. For example, with reference to the coordinated network configuration system 500, at block 802 the networking device 404a may only receive the networking device configuration for the networking device 502. However, in another example, at block 802 the networking device 404a may receive the networking device configurations for the networking device 502 and the networking device 404b. Furthermore, in yet another example, at block 802 the networking device 404a may receive the networking device configurations for the networking device 502, as well as each of the networking devices 404b and up to 404c (e.g., all of the networking devices in the coordinated network configuration system 500.) As such, one of skill in the art in possession of the present disclosure will recognize that, at block 802, any of the networking devices may receive networking device configurations from one other networking device, from directly connected networking devices, and/or from any or all of the networking devices in the coordinated network configuration system while remaining within the scope of the present disclosure.

The method 800 then proceeds to decision block 804 where the first networking device determines whether coordinated configuration operations will prevent communication with the management device. In an embodiment, at decision block 804, any networking device that received networking device configuration(s) for at least one other networking device may operate to determine whether coordinated configuration operations (discussed above with reference to block 608 of the methods 600 and 700) will cause configuration issues such as preventing communications with the management device. For example, at decision block 804 the coordinated configuration engine 304 in the networking device 300/404a may operate to determine whether coordinated configuration operations using the networking configurations for each of the networking devices 404a, 404b, and 502 will prevent communication between the management device 402 and any of the networking devices 404a, 404b, and/or 502.

In an embodiment, the determination of whether coordinated configuration operations will prevent communication between any of the networking devices and the management device may include determining whether the MTU size is set inconsistently across networking devices (which can result in a loss of communications). In another embodiment, the determination of whether coordinated configuration operations will prevent communication between any of the networking devices and the management device may include determining whether STP characteristics are incorrectly applied (e.g., determining whether an interface between networking devices is designated as an edge port (e.g., portfast with Bridge Data Protocol Unit (BDPU)-Guard) and will cause that interface to be put in an error state that shuts down that interface.) In another embodiment, the determination of whether coordinated configuration operations will prevent communication between any of the networking devices and the management device may include determining whether a non-native VLAN is being used for in-band management traffic and that VLAN is not allowed on all interfaces throughout the link to the management system (which can prevent traffic from reaching its destination on that link). While a few specific examples have been provided, one of skill in the art in possession of the present disclosure will recognize a variety of other determinations that may be made in order to identify whether coordinated configuration operations will prevent communication (or any other issues) between any of the networking devices and the management device.

For example, at decision block 804 the networking devices may use the networking device configurations (or information about those networking devices configurations that does not necessarily utilize the complete set of commands in those networking device configurations) to determine whether communications between the networking devices (or between the management device and any networking device) remain available, whether VLANs configured on the networking device are correct, whether Maximum Transmission Units (MTUs) provided via those networking device configurations correspond, and/or to determine a variety of other configuration characteristics known in the art. In a specific example, at decision block 804, one or more of the networking devices in the network may determine whether the networking device configurations are compatible by making sure a path for a VLAN reaches an endpoint via any subset of the networking devices. In another embodiment, at block 804 it may be determined that directly connected interfaces on networking devices are consistent by ensuring that a checklist of features and settings on those interfaces match and are complementary and compliant with standard configuration practices. For example, if a first trunk interface on a first networking device allows access to VLAN 5, and a directly connected second trunk interface on a second networking device does not allow access to VLAN 5, that inconsistency will be detected (particularly if VLAN 5 is a designated management VLAN required for communication to the other networking devices.) In yet other examples of block 804, the networking devices 404a-404c and/or 502 may operate to analyze directly connected ports and flag inconsistent configurations between those interfaces, and if there is an inconsistency then those networking devices may would the management device 402 and/or the user or administrator (and, in some examples, stop the application of coordinated configuration operations.)

If, at decision block 804, the first networking device determines that coordinated configuration operations will prevent communication with the management device, the method 800 proceeds to block 806 where the first networking device may send a message that identifies the configuration issue determined at decision block 804 and/or requests that the coordination configuration operations be stopped. In an embodiment, any networking device in the coordinated network configuration systems 400 and/or may determine, at decision block 804, that coordinated configuration operations will prevent communications with the management device 402 and, in response, send a message that identifies the configuration issue and/or requests that the coordination configuration operations be stopped at block 806. For example, at block 806, the coordinated configuration engine 304 in the networking device 300/404a may send a message through the management network connection 406a (via its communication subsystem 308) to the management device 402 that identifies the configuration issue and/or requests that the coordination configuration operations be stopped.

The management engine 204 in the management device 200/402 may then receive that message via its communication subsystem 308 and, in response, stop (or not start) coordinated configuration operations. In some examples, the management device 200/402 may send a message to one or more of the networking devices to stop coordinated configuration operations. In another example, at block 806, the coordinated configuration engine 304 in the networking device 300/404a may send a message through the links 408a-408c and/or the links 504a-504c (via its communication subsystem 308) to the networking devices 404b and/or 502 that identifies the configuration issue and/or requests that the coordination configuration operations be stopped. In addition, the coordinated configuration engine 304 in the networking device 300/404a that identifies the configuration issue and/or requests that the coordination configuration operations be stopped, may provide the message to stop coordinated configuration operations through the links 408a-408c to the networking devices 404b for forwarding to the other networking devices (e.g., the networking devices up to networking device 404c), or the coordinated configuration engine 304 in the networking device 300/404b may, upon receiving the message to stop coordinated configuration operations from the networking device 404a, may then send its own message to stop coordinated configuration operations to the other networking devices (e.g., the networking devices up to networking device 404c.)

In different embodiments, the stopping of the coordinated configuration operations (i.e., in response to the message(s) sent at block 806) may be applied to different networking devices in the coordinated network configuration systems. In some embodiments, the message(s) to stop coordinated configuration operations at block 806 may be sent to every networking device in the coordinated network configuration system in order to stop all coordinated configuration operations. As such, upon receiving the message to stop coordinated configuration operations, the coordinated configuration engine 304 in each of the networking devices may operate to stop (or not begin performing) the coordinated configuration operations discussed above with reference to block 608. However, in some embodiments, the message(s) to stop coordinated configuration operations at block 806 may be sent to a subset of the networking devices in the coordinated network configuration system in order to stop coordinated configuration operations. For example, message(s) to stop coordinated configuration operations at block 806 may only be sent to networking devices for which it has been determined that coordinated configuration operations will prevent communications with the management device 402. In another example, message(s) to stop coordinated configuration operations at block 806 may only be sent to networking devices that are directly connected to a networking device that has determined that coordinated configuration operations will prevent communications with the management device 402. As such, upon receiving the message to stop coordinated configuration operations, the coordinated configuration engines 304 in a subset of the networking devices may operate to stop (or not begin performing) the coordinated configuration operations discussed above with reference to block 608. While a few examples have been provided, one of skill in the art in possession of the present disclosure will recognize that any number or combination of networking devices in a network may be stopped or prevented from performing coordinated configuration operations at block 806 to ensure that each of the networking devices in the coordinated network configuration system may be remotely configured without the need for user intervention.

If, at decision block 804, the first networking device determines that coordinated configuration operations will not prevent communication with the management device, the method 600 then proceeds to decision block 606 where the first networking device determines whether other networking devices have received their respective networking device configurations in substantially the same manner as discussed above with reference to the method 600. If, at decision block 606, the first networking device determines that other networking devices have not received their respective networking device configurations, the method 600 returns to decision block 606 in substantially the same manner as discussed above with reference to the method 600. If, at decision block 606, the first networking device determines that other networking devices have received their respective networking device configurations, the method 600 then proceeds to block 608 where the first networking device performs coordinated configuration operations using its first networking device configuration while each of the other networking devices perform coordinated configuration operations using their respective networking device configurations in substantially the same manner as discussed above with reference to the method 600.

In some embodiments, the coordinated configuration operations may provide configuration changes that are enabled but not committed (i.e., the coordinated configuration operations may be performed after all of the networking devices have received their networking device configurations, but may also be reverted back if not committed to by rebooting each fo the networking devices. (this is not an current feature of many switches without rebooting the switch). In another embodiment, the networking devices may autonomously use troubleshooting features (e.g., ping, traceroute, etc.) to provide validation that a configuration change, or a new corrected configuration, maintains the communication path between each networking device and the management device. The networking devices may also be configured to report validation or other statistics back to the management device to help with performance issues and, if an issue occurs, the configuration may be reverted back to previous configuration without a need for reboot. In another embodiment, a test packet to be used in the validation of the networking device configurations that are being applied. For example, the test packet may be designed by a user or administrator to specifically test out if an Access Control List (ACL) is working as expected (e.g., if a packet that is designed to be blocked is actually blocked) and if an issue is found, configuration may be reverted back to a previous configuration without a need for reboot. In some embodiments, the networking devices may operate to correct errors associated with networking device configurations, and then use those corrected networking device configurations to configure themselves. In such embodiments, the error correction and automatic configuration may be required to be error-free to ensure that incorrect configuration operations do not raise security issues, and any automatic configuration changes may be flagged for review so that the user or administrator can ensure security policies are reflected in the automatic changes and can immediately correct any issues if they are present.

Thus, the method 800 provides for provides for the distribution of networking device configurations to a plurality of networking devices, as well as the determination of whether the application of those networking device configurations by those networking devices will cause communication issues that may prevent the complete configuration of the networking device in the network in a remote manner (i.e., with user or administrator intervention.) Such determinations may prevent issues that require onsite support by stopping configuration operations before those configuration operations can modify any networking device in a manner that prevent remote management of that networking device, and thus ensure that when those configurations are applied in a coordinated manner they will not cause configuration issues such as the disablement of communications between those networking devices and the management device in a manner that prevents the remaining configuration of those (or other) networking devices in the network.

Thus, systems and methods have been described that provide for configuration of networking devices in a network in a remote manner without the need for onsite support to deal with conventional issues that typically arise using conventional configuration techniques. This may be accomplished, at least in part, by providing each networking device configuration to its respective networking device prior to beginning any configuration operations. Furthermore, in some embodiments, one or more networking devices in the network may analyze its networking device configuration as well as one or more networking devices configuration provided for other networking devices in the network (e.g., networking devices to which it is directly connected), and determine whether the application of those networking device configuration will cause any configuration issues such as communication problems with the management device. As such, the application of any configurations that may prevent remote access to any of the networking devices in the network may be prevented to ensure that each of the networking devices in the network may be controlled and/or configured remotely from a management device. Furthermore, at least a subset of the networking device may operate to apply at least a portion of their networking device configurations in a coordinated manner (e.g., at the same time or at substantially the same time) to ensure remote network configuration may be completed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A coordinated network configuration system, comprising:
   a management network;
   a management device that is coupled to the management network and that is configured to provision networking device configurations through the management network; and
   a plurality of networking devices, wherein a first networking device of the plurality networking devices is coupled to the management device through the management network, and wherein the first networking device is configured to:
   receive, from the management device through the management network, a first networking device configuration;
   store the first networking device configuration;
   delay performance of configuration operations on the first networking device using the first networking device configuration until each of the plurality of networking devices have received respective networking device configurations;
   determine that each of the plurality of networking devices have received respective networking device configurations;
   analyze at least one of the respective networking device configurations for at least one of the plurality of networking devices and, in response, determine whether the coordinated configuration operations using the first networking device configuration and the at least one of the respective networking device configurations will prevent communication between the management device and either of the first networking device and the at least one of the plurality of networking device; and perform, in response to determining that each of the plurality of networking devices have received respective networking device configurations and determining that the coordinate configuration operations using the first networking device configuration and the at least one of the respective networking device configurations will not prevent communication between the management device and either of the first networking device and the at least one of the plurality of networking devices, coordinated configuration operations using the first networking device configuration at the same time each of the others of the plurality of networking devices performs the coordinated configuration operations using their respective networking device configurations.

2. The coordinated network configuration system of claim 1, further comprising:

a second networking device of the plurality of networking devices, wherein the second networking device is coupled to the first networking device through at least one link, and wherein the first networking device is configured to:

receive, from the management device through the management network, a second networking device configuration; and provide, to the second networking device through the at least one link, the second networking device configuration, wherein the second networking device is configured to:

determine that each of the plurality of networking devices have received their respective networking device configurations and, in response, perform the coordinated configuration operations using the second networking device configuration while the first networking device performs the coordinated configuration operations using the first networking device configuration such that the at least one link is configured.

3. The coordinated network configuration system of claim 2, wherein the at least one link includes a plurality of links that couple the first networking device to the second networking device, and wherein the configuration of the at least one link includes the configuration of the plurality of links in a Link Aggregation Group (LAG).

4. The coordinated network configuration system of claim 1, further comprising:

a second networking device of the plurality of networking devices, wherein the second networking device is coupled to the management device through the management network, and wherein the second networking device is configured to:

receive, from the management device through the management network, a second networking device configuration;

store the second networking device configuration; and determine that each of the plurality of networking devices have received their respective networking device configurations and, in response, perform coordinated configuration operations using the second networking device configuration at the same time each of the others of the plurality of networking devices performs the coordinated configuration operations using their respective networking device configurations.

5. The coordinated network configuration system of claim 1, wherein the first networking device is configured to:

stop the coordinated configuration operations using the first networking device configuration in response to determining that the coordinated configuration operations using the first networking device configuration and the at least one of the respective networking device configurations will prevent communication between the management device and either of the first networking device and the at least one of the plurality of networking devices.

6. The coordinated network configuration system of claim 1, wherein the first networking device is configured to:

determine that each of the plurality of networking devices have received their respective networking device configurations in response to determining that a period of time has passed following the receiving of the first networking device configuration.

7. The coordinated network configuration system of claim 1, wherein the first networking device is configured to:

determine that each of the plurality of networking devices have received their respective networking device configurations in response to receiving, from the management device through the management network, a coordinated configuration initiation message.

8. An Information Handling System (IHS) comprising:

a communication subsystem;

a processing system that is coupled to the communication subsystem; and a memory system that is coupled to the processing system and that includes instruction that, when executed by the processing system, cause the processing system to provide a coordinated configuration engine that is configured to:

receive, through the communication subsystem from a management device via a management network, a first networking device configuration;

store the first networking device configuration;

delay performance of configuration operations using the first networking device configuration until each of a plurality of networking devices coupled to the management device have received respective networking device configurations;

determine that each of the plurality of networking devices that are coupled to the management device have received respective networking device configurations;

analyze at least one of the respective networking device configurations for at least one of the plurality of networking devices and, in response, determine whether the coordinated configuration operations using the first networking device configuration and the at least one of the respective networking device configurations will prevent communication between the management device and either of the communication subsystem and the at least one of the plurality of networking device; and perform, in response to determining that each of the plurality of networking devices that are coupled to the management device have received respective networking device configuration and determining that the coordinated configuration operations using the first networking device configuration and the at least one of the respective networking device configurations will not prevent communication between the management device and either of the communication subsystem and the at least one of the plurality of networking devices, coordinate configuration operations using the first networking device configuration while each of the others of the plurality of networking devices performs the coordinated configuration operations using their respective networking device configurations.

9. The IHS of claim 8, further comprising:
a plurality of links that are provided by the communication subsystem and that are coupled to a second networking device that performs the coordinated configuration operations using a second networking device configuration, wherein the coordinated configuration operations using the first networking device configuration and the second networking device configuration operate to configure the plurality of links in a Link Aggregation Group (LAG).

10. The IHS of claim 8, wherein the coordinated configuration engine is configured to:
receive, through the communication subsystem from the management device via the management network, a second networking device configuration; and
provide, through the communication subsystem to a second networking device via at least one link, the second networking device configuration that provides the respective networking device configuration used by the second networking device to perform the coordinated configuration operations.

11. The IHS of claim 8, wherein the coordinated configuration engine is configured to:
stop the coordinated configuration operations using the first networking device configuration in response to determining that the coordinated configuration operations using the first networking device configuration and the at least one of the respective networking device configurations will prevent communication between the management device and either of the communication subsystem and the at least one of the plurality of networking devices.

12. The IHS of claim 8, wherein the determination that each of the plurality of networking devices have received their respective networking device configurations is performed in response to determining that a period of time has passed following the receiving of the first networking device configuration.

13. The IHS of claim 8, wherein the determination that each of the plurality of networking devices have received their respective networking device configurations is performed in response to receiving, through the communication subsystem from the management device via the management network, a coordinated configuration initiation message.

14. A method for coordinated configuration of a network, comprising:
receiving, by a first networking device through a management network from a management device, a first networking device configuration;
storing, by the first networking device, the first networking device configuration; and
determining, by the first networking device, that each of a plurality of networking devices that are coupled to the management device have received respective networking device configurations;

analyzing, by the first networking device, at least one of the respective networking device configurations for at least one of the plurality of networking devices and, in response, determine whether the coordinated configuration operations using the first networking device configuration and the at least one of the respective networking device configurations will prevent communication between the management device and either of the first networking device and the at least one of the plurality of networking device; and
performing, by the first networking device in response to determining that each of a plurality of networking devices that are coupled to the management device have received respective networking device configurations and determining that the coordinate configuration operations using the first networking device configuration and the at least one of the respective networking device configurations will not prevent communication between the management device and either of the first networking device and the at least one of the plurality of networking device, coordinated configuration operations using the first networking device configuration at the same time each of the others of the plurality of networking devices performs the coordinated configuration operations using their respective networking device configurations.

15. The method of claim 14, further comprising:
receiving, by the first networking device through the management network from the management device, a second networking device configuration;
providing, by the first networking device through at least one link to a second networking device, the second networking device configuration; and
determining, by the second networking device, that each of the plurality of networking devices have received their respective networking device configurations and, in response, performing the coordinated configuration operations using the second networking device configuration while the first networking device performs the coordinated configuration operations using the first networking device configuration to configure at least one link that couples the first networking device to the second networking device.

16. The method of claim 15, wherein the at least one link includes a plurality of links that couple the first networking device to the second networking device, and wherein the configuration of the at least one link includes the configuration of the plurality of links in a Link Aggregation Group (LAG).

17. The method of claim 14, further comprising:
receiving, by a second networking device through the management network from the management device, a second networking device configuration;
storing, by the second networking device, the second networking device configuration; and
determining, by the second networking device, that each of the plurality of networking devices have received their respective networking device configurations and, in response, performing coordinated configuration operations using the second networking device configuration while each of the others of the plurality of networking devices performs the coordinated configuration operations using their respective networking device configurations.

18. The method of claim 14, further comprising:
stopping, by the first networking device, the coordinated configuration operations using the first networking device configuration in response to determining that the coordinated configuration operations using the first networking device configuration and the at least one of the respective networking device configurations will prevent communication between the management device and either of the first networking device and the at least one of the plurality of networking devices.

19. The method of claim 14, further comprising:
determining, by the first networking device, that each of the plurality of networking devices have received their respective networking device configurations in response to determining that a period of time has passed following the receiving of the first networking device configuration.

20. The method of claim 14, further comprising:
determining, by the first networking device, that each of the plurality of networking devices have received their respective networking device configurations in response to receiving, by the first networking device through the management network from the management device, a coordinated configuration initiation message.

\* \* \* \* \*